(12) United States Patent
Chen et al.

(10) Patent No.: US 10,944,596 B2
(45) Date of Patent: Mar. 9, 2021

(54) RRM MEASUREMENT AND CHANNEL ESTIMATION BASED ON REFERENCE SIGNALS OF COEXISTING COMMUNICATION SYSTEMS

(71) Applicant: MEDIATEK (Beijing) INC., Beijing (CN)

(72) Inventors: Tao Chen, Beijing (CN); Zhixun Tang, Beijing (CN); Min Lei, Beijing (CN)

(73) Assignee: MEDIATEK (Beijing) INC., Beijing (CN)

(*) Notice: Subject to any disclaimer, the term of this patent is extended or adjusted under 35 U.S.C. 154(b) by 122 days.

(21) Appl. No.: 16/163,356

(22) Filed: Oct. 17, 2018

(65) Prior Publication Data

US 2020/0092141 A1 Mar. 19, 2020

(30) Foreign Application Priority Data

Sep. 14, 2018 (CN) .......................... 201811072601.8

(51) Int. Cl.
| | |
|---|---|
| *H04L 25/02* | (2006.01) |
| *H04L 5/00* | (2006.01) |
| *H04L 27/26* | (2006.01) |
| *H04B 17/382* | (2015.01) |
| *H04B 17/309* | (2015.01) |
| *H04W 48/10* | (2009.01) |
| *H04W 48/12* | (2009.01) |
| *H04J 11/00* | (2006.01) |

(52) U.S. Cl.
CPC ....... *H04L 25/0224* (2013.01); *H04B 17/309* (2015.01); *H04B 17/382* (2015.01); *H04J 11/0069* (2013.01); *H04L 5/0048* (2013.01); *H04L 25/0204* (2013.01); *H04L 27/2613* (2013.01); *H04W 48/10* (2013.01); *H04W 48/12* (2013.01); *H04J 2211/005* (2013.01)

(58) Field of Classification Search
CPC combination set(s) only.
See application file for complete search history.

(56) References Cited

U.S. PATENT DOCUMENTS

| | | | |
|---|---|---|---|
| 2015/0358848 A1* | 12/2015 | Kim | H04W 56/001 370/252 |
| 2016/0119936 A1* | 4/2016 | Kim | H04W 72/0446 370/329 |
| 2017/0105112 A1* | 4/2017 | Park | H04W 8/005 |
| 2018/0091212 A1* | 3/2018 | Lee | H04B 7/088 |

(Continued)

*Primary Examiner* — Yee F Lam
(74) *Attorney, Agent, or Firm* — Oblon, McClelland, Maier & Neustadt, L.L.P.

(57) ABSTRACT

Aspects of the disclosure provide a method for radio resource management (RRM) measurement and channel estimation. The method can include receiving first reference signals of a first system in a wireless communication network at a user equipment (UE), receiving second reference signals of a second system in the wireless communication network at the UE, receiving a quasi-co-location (QCL) configuration from one of the first system and the second system, the QCL configuration indicating the first reference signals and the second reference signals are quasi-co-located (QCLed) or co-located, and performing an RRM measurement and/or a channel estimation based on a combination of the QCLed first reference signals and second reference signals.

19 Claims, 4 Drawing Sheets

(56) References Cited

U.S. PATENT DOCUMENTS

| | | | | |
|---|---|---|---|---|
| 2018/0220403 A1* | 8/2018 | John Wilson | .......... | H04B 7/088 |
| 2018/0279271 A1* | 9/2018 | Sadiq | ................ | H04W 56/0015 |
| 2018/0316472 A1* | 11/2018 | John Wilson | ......... | H04W 76/15 |
| 2018/0323830 A1* | 11/2018 | Park | ........................ | H04B 7/024 |
| 2018/0331860 A1* | 11/2018 | Bergman | .............. | H04L 5/0048 |
| 2019/0074880 A1* | 3/2019 | Frenne | ................. | H04B 7/0626 |
| 2019/0081753 A1* | 3/2019 | Jung | ..................... | H04L 5/0023 |
| 2019/0103951 A1* | 4/2019 | Park | ........................ | H04L 1/0026 |
| 2019/0141692 A1* | 5/2019 | Subramanian | ....... | H04B 7/0695 |
| 2019/0261329 A1* | 8/2019 | Park | ......................... | H04B 7/08 |
| 2020/0022010 A1* | 1/2020 | Kim | ..................... | H04W 24/02 |
| 2020/0044723 A1* | 2/2020 | Cirik | .................... | H04W 36/06 |
| 2020/0045745 A1* | 2/2020 | Cirik | ................. | H04W 74/0833 |
| 2020/0052769 A1* | 2/2020 | Cirik | .................... | H04B 7/0695 |
| 2020/0053613 A1* | 2/2020 | Cirik | .................... | H04W 76/27 |
| 2020/0059951 A1* | 2/2020 | Frenne | ................. | H04L 5/0023 |
| 2020/0221427 A1* | 7/2020 | Nilsson | ................ | H04B 7/0695 |

\* cited by examiner

RRM MEASUREMENT AND CHANNEL ESTIMATION BASED ON REFERENCE SIGNALS OF COEXISTING COMMUNICATION SYSTEMS

INCORPORATION BY REFERENCE

This present disclosure claims the benefit of Chinese Patent Application No. 201811072601.8, "Method and Apparatus for RRM Measurement and Channel Estimation Based on Reference Signals of Coexisting Communication Systems" filed on Sep. 14, 2018, which is incorporated herein by reference in its entirety.

TECHNICAL FIELD

The present disclosure relates to wireless communications, and particularly relates to the usage of reference signals of coexisting communication systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Communication systems have been developed rapidly. For example, 5th Generation (5G) New Radio (NR) is a newly developed wireless communication technology. When initially deployed, 5G NR can coexist with the legacy Long Term Evolution (LTE) system. Gradually, mobile service users may migrate from LTE to 5G NR, and 5G NR networks may re-farm the spectrum previously deployed for LTE networks. During this process, some mobile devices can be introduced that are capable of connecting to both communication networks.

SUMMARY

Aspects of the disclosure provide a method for radio resource management (RRM) measurement and channel estimation. The method can include receiving first reference signals of a first system in a wireless communication network at a user equipment (UE), receiving second reference signals of a second system in the wireless communication network at the UE, receiving a quasi-co-location (QCL) configuration from one of the first and second systems, the QCL configuration indicating the first reference signals and the second reference signals are quasi-co-located (QCLed) or co-located, and performing an RRM measurement and/or a channel estimation based on a combination of the QCLed first reference signals and second reference signals. In one example, the first system is a Long Term Evolution (LTE) system, and the second system is a New Radio (NR) system.

In an embodiment, the QCL configuration can include information indicating a first cell corresponding to the first reference signals is QCLed or co-located with a second cell corresponding to the second reference signals. In one example, the QCL configurations further include information indicating primary synchronization signals (PSSs), secondary synchronization signals (SSSs), or cell-specific reference signals (CRSs) of the first system are QCLed with synchronization signal blocks (SS blocks) identified by an SS block index, and/or a channel state indicator reference signal (CSI-RS) of the second system.

In an embodiment, the QCL configurations includes a QCL type that is associated with a set of channel properties with respect to which the QCLed first and second reference signals are equivalent. In one example, the QCL type is one of:

QCL Type A: {Doppler shift, Doppler spread, average delay, delay spread},
QCL Type B: {Doppler shift, Doppler spread},
QCL Type C: {Doppler shift, average delay}, or
QCL Type D: {Spatial reception parameter}.

In an embodiment, the QCL configuration includes a power offset between the QCLed first and second reference signals. In one example, the power offset is represented as an energy per resource element (EPRE) offset. In an embodiment, the QCL configuration is transmitted to the UE by a broadcasted system information block (SIB) or a dedicated signaling message, or is fixed/specified in the specification.

In an embodiment, the method further includes receiving or detecting reference signal configurations of the first reference signals and/or the second reference signals. In one example, the reference signal configuration of the first reference signals includes one of:

a cell identity (ID) corresponding to the first system,
a number of CRS antenna ports corresponding to the cell ID, or
PSS timing or SSS timing corresponding to the cell ID.

In one example, the reference signal configuration of the second reference signals includes one of:

a cell ID corresponding to the second system,
a subcarrier spacing corresponding to the cell ID,
an SS block burst set period corresponding to the cell ID,
a number and timings of SS blocks in each SS block burst set corresponding to the cell ID, or
an SS block measurement timing configuration (SMTC) offset corresponding to the cell ID.

In various examples, the UE is in dual connectivity with the first system and the second system, or the UE is in single connectivity with one of the first system and the second system.

In an embodiment, the performing the RRM measurement based on the combination of the QCLed first reference signals and second reference signals includes obtaining a first measurement with the second reference signals, and a second measurement with the first reference signals, normalizing the first or second measurement according to a power offset, and averaging the formalized first and second measurements to obtain a combined measurement. In one example, the normalizing the first or second measurement according to the power offset includes removing an amount of power defined by the power offset from the first or second measurement corresponding to the first or second reference signals that have a higher transmission power, or adding the amount of power defined by the power offset to the first or second measurement corresponding to the first or second reference signals that have a lower transmission power.

In an embodiment, the performing the channel estimation based on the combination of the QCLed first reference signals and second reference signals include estimating channel statistic characteristics based on at least a first orthogonal frequency division multiplex (OFDM) symbol carrying the first reference signals, and a second OFDM symbol carrying the second reference signals. The first and second OFDM symbols are adjacent to each other.

In an embodiment, the method includes performing a first channel estimation based on the first reference signals, results of the first channel estimation used for coherent demodulation of second physical channels of the second system, or performing a second channel estimation based on the second reference signals, results of the second channel estimation used for coherent demodulation of first physical channels of the first system.

Aspects of the disclosure provide an apparatus. The apparatus can include circuitry configured to receive first reference signals of a first system in a wireless communication network, receive second reference signals of a second system in the wireless communication network, receive a QCL configuration from one of the first system and the second system, the QCL configuration indicating the first reference signals and the second reference signals are QCLed or co-located, and perform a RRM measurement and/or a channel estimation based on a combination of the QCLed first reference signals and second reference signals.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
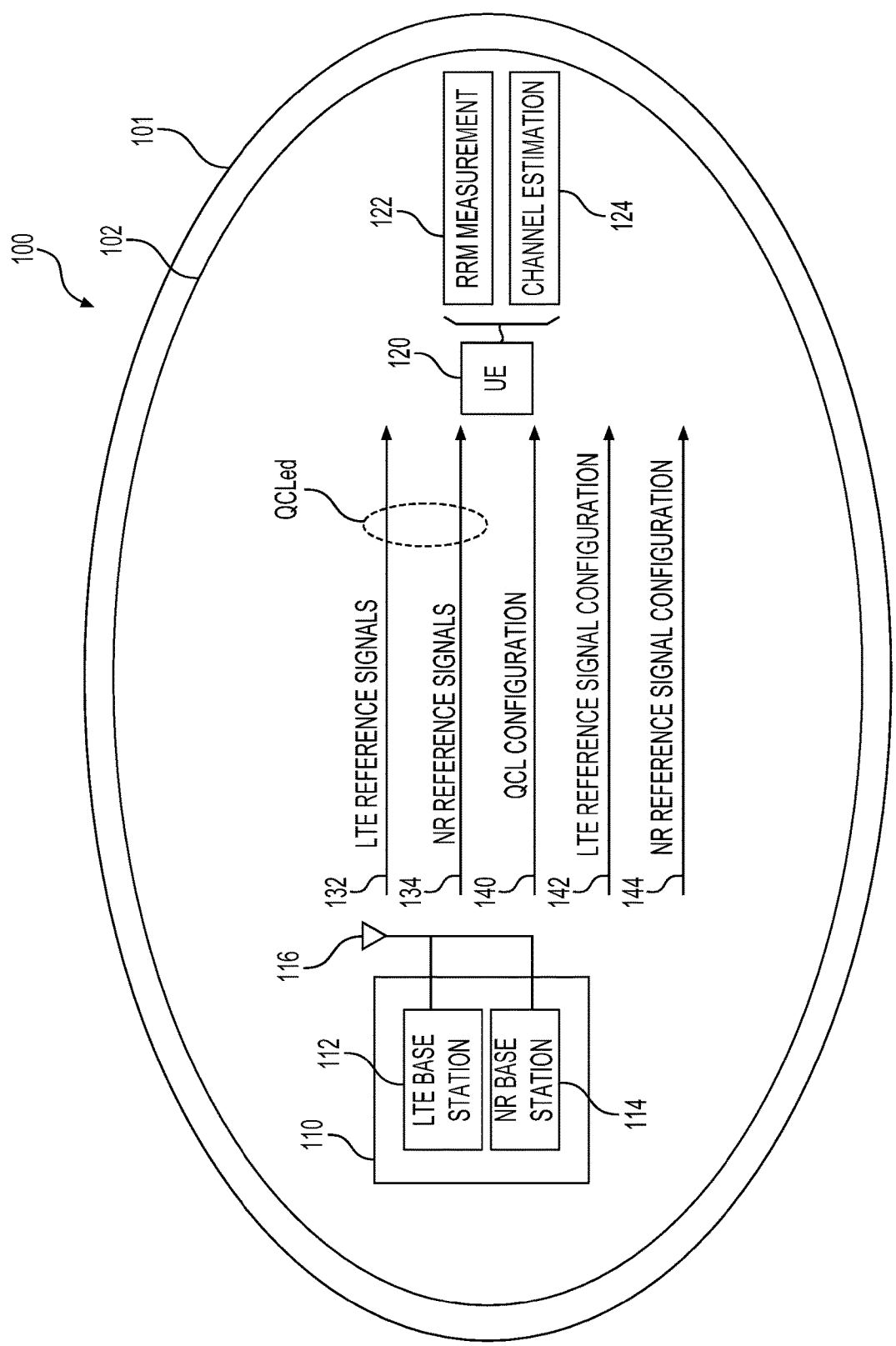
FIG. 1 shows a wireless communication system according to embodiments of the disclosure.

FIG. 1 shows a wireless communication system 100 according to embodiments of the disclosure. The system 100 includes an LTE base station (BS) 112 and a NR BS 114 co-located at a site 110. The LTE BS 112 can implement an eNB as specified by LTE standards developed by the 3rd Generation Partnership Project (3GPP). The NR BS 114 can implement a gNB as specified by NR standards developed by the 3GPP. The system 100 further includes a user equipment (UE) 120 positioned within a coverage of a first cell 101 formed by the LTE BS 112 and a second cell 102 formed by the NR BS 114. The UE 120 can be a mobile phone, a laptop computer, a vehicle carried device, and the like.

FIG. 1 shows an example of coexistence between an LTE system and a NR system. Generally, 5G NR is a newly developed technology, and when introduced, may coexist with the previously deployed 4G LTE systems. For example, 5G NR and 4G LTE may be deployed on separate spectra. A 5G NR system operates on a higher frequency band (e.g., greater than 6 GHz), while a coexisting 4G LTE system operates on a lower frequency band (e.g., below 6 GHz). Alternatively, a 5G NR system and a 4G LTE system may share a same carrier. For example, a 5G NR system and a 4G LTE system may share a same carrier for uplink transmissions, but perform downlink transmissions with separate carriers. Or, a 5G NR system and a 4G LTE system may share one or two carriers for both uplink and downlink transmissions (one carrier for time division duplex (TDD) or two carriers for frequency division duplex (FDD)). The sharing of time-frequency resources over the shared uplink or downlink carriers can be realized by dynamic scheduling or in a semi-static manner. In addition, BSs of the coexisting LTE system and NR system (e.g., eNB and gNB) may be co-located or not co-located.

Corresponding to the LTE/NR coexistence deployment scenarios, a UE may operate on the LTE system, the NR system, or both systems. For example, a legacy UE may operate on the LTE system, while a newly introduced UE may be capable of access to both the NR and LTE systems simultaneously. As an example, an LTE/NR dual connectivity (DC) scheme, referred to as E-UTRAN New Radio Dual Connectivity (EN-DC), is specified in 3GPP NR standards. Under EN-DC (or NE-DC), a UE may transmit user data or control signaling (e.g., radio resource control (RRC) messages) through the LTE system and NR system in parallel. In order to save power, a UE capable of DC may opt to connect to one system, for example, when high data rate is not needed.

In an example of a UE operating with EN-DC (or NE-DC), an LTE eNB of an LTE system can serve as a master node. An associated NR gNB of a NR system can serve as a secondary node. The master node forms a first primary cell (PCell). The secondary node forms a second primary cell (PSCell). The UE may initially establish a first connection with the master node. The master node may then instruct the UE to establish a second connection with the NR system. After the two connections are established, user data can be split between the master node and the secondary node. In alternative examples, a NR gNB may serve as a master node coordinating with an LTE eNB that functions as a secondary node.

While operating with EN-DC (or NE-DC), the UE may receive reference signals from both systems. For example, Primary Synchronization Signals (PSSs), Secondary Synchronization Signals (SSSs), and Cell Specific Reference Signals (CRSs) may be received from an LTE cell while Synchronization Signal Blocks (SS blocks) or Channel State Information Reference Signals (CSI-RSs) may be received from a NR cell.

UE may operate with a single system, for example, the LTE system or the NR system. With the assistance signaling information containing QCL related configuration/parameters, the UE may autonomously, request or follow the base station signaling to switch on the other system (e.g., the NR system or the LTE system) for joint/independent RS measurement, so as to improve overall RRM measurement and/or channel estimation performance.

Regarding the SS blocks, as specified in 3GPP NR standards, each of the SS blocks may include a PSS, an SSS, a Physical Broadcast Channel (PBCH), and demodulation reference signals (DMRSs). The SS blocks may be organized into periodically transmitted SS block burst sets. Each SS block burst set may include a sequence of SS blocks. Each SS block is associated with an SS block index for identifying the respective SS block.

In FIG. 1 example, the LTE BS 112 and the NR BS 114 are co-located at the same site 110. In one example, the BS 112 and the BS 114 may be integrated together and share a same radio frequency (RF) module, and a same antenna 116. In other examples, the BS 112 and the BS 114 may be separate from each other and connected with same or different antennas.

Corresponding to the co-located BSs 112 and 114, reference signals transmitted from the LTE system corresponding to the LTE BS 112 and the NR system corresponding to the NR BS 114 can be quasi-co-located (QCLed) or co-located. In other words, reference signals corresponding to the BS 112 and the BS 114, when received at the UE 120, are equivalent in terms of reflecting certain channel properties/characteristics of the channel between the BSs 112-114 and the UE 120. Accordingly, the QCLed reference signals from the LTE BS 112 and the NR BS 114 can be combined for Radio Resource Management (RRM) measurement or channel estimation. For example, RRM measurement results may include measurements of Reference Signal Received Power (RSRP), Carrier Received Signal Strength Indicator (RSSI), Reference Signal Received Quality (RSRQ), or the like. Channel estimation results may be used for coherent demodulation of physical layer broadcast channel, control channel, data channel, or the like.

In FIG. 1 example, LTE reference signals 132 of the LTE cell 101 and NR reference signals 134 of the NR cell 102 are QCLed due to the co-located deployment of the BSs 112 and 114. Accordingly, the UE 120 can perform RRM measurement 122 and/or channel estimation 124 based on a combination of the LTE reference signals 132 and the NR reference signals 134. When the reference signals 132 and 134 from the two sources (the LTE system and the NR system) are combined together, reference signal density in time domain and/or frequency domain can be increased compared with using reference signals from a single source. A higher reference signal density may improve accuracy of the RRM measurement 122 or channel estimation 124 at the UE 120, thus enhancing the respective RRM measurement and channel estimation performance.

To facilitate RRM measurement and channel estimation, quasi-co-location (QCL) configuration 140 may be transmitted from the BS 112 or 114 to the UE 120. In one example, the QCL configuration 140 may include information indicating which LTE cells are QCLed or co-located with which NR cells. For example, a set of LTE cell identities (IDs) and a set of NR cell IDs may be provided, and QCLed/co-located LTE cells and NR cells may be indicated by associating respective cell IDs.

In one example, the QCL configuration 140 may include information indicating what reference signals are QCLed between the LTE cell 101 and NR cell 102. For example, LTE PSS, SSS, and/or CRS of the LTE cell 101 is indicated to be QCLed with one or multiple NR SS blocks (identified by respective SS block indexes) in a SS block burst set of the NR cell 102. Additionally, the LTE PSS/SSS/CRS of the LTE cell 101 is indicated to be QCLed with CSI-RSs of the NR cell 102. The CSI-RSs may have certain periodicity, or may correspond to the one or multiple QCLed NR SS blocks of the NR cell 102, thus may be indicated by respective SS block indexes.

In one example, the QCL configuration 140 may further include information indicating a QCL type corresponding to the pair of QCLed LTE cell 101 and NR cell 102, or corresponding to the QCLed LTE and NR reference signals 132 and 134. The QCL type indicates or is associated with a set of channel properties or channel statistic characteristics. The QCLed LTE and NR reference signals 132 and 134 received at the UE 120 are equivalent with respect to the set of channel properties. In one example, at least one of the following QCL types is defined:

QCL Type A: {Doppler shift, Doppler spread, average delay, delay spread};
QCL Type B: {Doppler shift, Doppler spread};
QCL Type C: {Doppler shift, average delay}; and
QCL Type D: {Spatial reception parameter}.

In alternative examples, different QCL types may be defined to be associated with different channel properties.

In one example, the QCLed configuration 140 may further indicate a power offset (or difference) between QCLed reference signals 132 and 134 from different systems (LTE or NR). For example, different reference signals of a same or two different cells may have different transmission power. Thus, received signal power of the reference signals 132 and 134 can be normalized during the RRM measurement or channel estimation process such that the reference signals from the two sources (LTE and NR systems) can be combined. In one example, the LTE BS 112 and the NR BS 114 operate with a same subcarrier spacing (e.g., 15 kHz). An Energy per Resource Element (EPRE) offset, for example, in dBm, is provided. The EPRE indicates an average transmission power of reference signals carried on multiple resource elements (REs). The multiple REs may be distributed in a measurement bandwidth and a measurement duration of a time-frequency grid of an OFDM system. An EPRE offset indicates a difference between EPREs of the respective reference signals of the QCLed LTE and NR systems.

In one example, the LTE BS 112 and the NR BS 114 operate with different subcarrier spacing (e.g., 15 kHz vs. 30 kHz). An EPRE offset can be similarly defined and provided. The EPRE can indicate an average transmission power of reference signals carried on respective REs (having a subcarrier spacing of 15 kHz or 30 kHz), and may, for example, have a unit of dBm. Thus, the EPRE offset between the two reference signals 132 and 134 with different subcarrier spacing configurations can be used to normalize the received power of the two reference signals 132 and 134.

In various examples, the QCL configuration 140 can be conveyed to the UE 120 through broadcast system information or dedicated signaling messages in the respective cell 101 or 102. For example, the QCL configuration 140 can be included in a system information block (SIB) that is broadcasted in the cell 101 or 102. Alternatively, the QCL configuration 140 can be signaled to the UE 120 through a dedicated RRC message, or a dedicated on-request SIB (as specified in 3GPP NR standards) in the cell 101 or 102. In one example, the QCL configuration 140 is part of an RRM measurement configuration configured by the BS 112 or 114 to the UE 120. In one example, the QCL configuration 140 is transmitted to the UE 120 separately from an RRM measurement configuration.

Besides QCL configuration 140, LTE and NR reference signal configurations 142 and 144 can be provided to the UE 120 from the cell 101 or 102 (as shown in FIG. 1), or detected by the UE 120 to facilitate RRM measurement and/or channel estimation. The reference signal configurations 142 and 144 may include information such as timing, frequency location, antenna port configuration, and the like, of the reference signals. Based on the reference signal configurations 142 and 144, the UE 120 may locate the respective reference signals, know configuration of the reference signals, and accordingly perform respective RRM measurement or channel estimation.

In one example, the LTE reference signal configuration 142 may include information of LTE cell IDs, and, corresponding to each LTE cell ID, number of CRS antenna ports, LTE PSS/LTE SSS timings, reference signal sequences, or the like. The NR reference signal configuration 144 may include information of NR cell IDs, and, corresponding to each NR cell ID, subcarrier spacing, SS block burst set period, number and timings of SS blocks in each SS block burst set, SS block measurement timing configuration (SMTC) offset, or the like. Additionally, the NR reference signal configuration 144 may include information indicating timings of CSI-RSs, such as periodicity of the CSI-RSs, time or frequency domain positions of the CSI-RSs, or SS block indexes associated with the CSI-RS, and the like.

In one example, the UE 120 is equipped with an LTE receiver and a NR receiver, and is in EN-DC state, connecting to both the BSs 112 and 114. For example, the LTE cell 101 operates as a PCell, while the NR cell 102 operates as a PSCell. The UE 120, by controlling the LTE receiver, may receive a set of LTE PSS/SSS in the LTE reference signals 132 to detect a cell ID of the LTE cell 101. The UE 120 may further decode a PBCH of the LTE reference signals 132 to detect a CRS antenna number. In addition, the UE 120, by controlling the NR receiver, may receive an SS block of the NR reference signals 134 to detect a cell ID of the NR cell 102. The UE 120 may further decode NR DMRS and a NR PBCH to detect an SS block index. Further, the UE 120 may receive an on-request SIB to obtain other NR reference signal configurations such as an SS block burst set period, a number of transmitted SS blocks in each SS block burst set, an SMTC offset, or the like.

In alternative examples where the UE 120 is in EN-DC with the BSs 112 and 114, the UE 120 may initially establish a connection with a master node, and subsequently receives respective reference signal configuration of a secondary node from the master node. Detection of the reference signal configuration of the secondary node can thus be skipped.

In one example, the UE 120 operates with a single connectivity to access to one of the LTE cell 101 or the NR cell 102 despite having the capability of DC. In such scenario, the UE 120 may turn on a receiver to detect reference signal configuration corresponding to the un-connected system, or receive the reference signal configuration of the un-connected system from the connected system. For example, the UE 120 is connected to the NR system of the cell 102 for transmitting user data. In order to take advantage of the LTE reference signals 132, the UE 120 may turn on the LTE receiver to receive the LTE reference signals 132 to detect the LTE reference signal configuration 142. Alternatively, the UE 120 may receive the LTE reference signal configuration 142 by RRC signaling from the NR BS 114.

With knowledge of the QCL configuration 140, and the LTE and NR reference signal configurations 142 and 143, the UE 120 may proceed to perform the RRM measurement 122 and/or channel estimation 124 by combining the LTE and NR reference signals 132 and 134.

In one example, the UE 120 performs RRM measurement according to an RRM measurement configuration of the NR cell 102. For example, in order to facilitate handover operations in the NR system, the UE 120 may be configured to monitor signal quality of a set of NR cells including the serving cell 102 and other NR neighboring cells. With the knowledge that the NR and LTE reference signals 134 and 132 are QCLed, the UE 120 may combine the LTE CRSs of the cell 101 with the SSSs of the NR SS blocks of the cell 102 to perform the RRM measurement for evaluating a quality of the NR cell 102.

For example, the UE 120 may first obtain a first measurement (e.g., RSRP) with the NR SSSs, and a second measurement with the LTE CRSs. Then, when a power offset between the NR and LTE reference signals is present, the UE 120 may perform a normalization to scale the first or second measurement to a same level. For example, an amount of power defined by the power offset (e.g., in dBm) may be removed from the measurement of the reference signals with a higher transmission power. Alternatively, the amount of power defined by the power offset (e.g., in dBm) may be added to the measurement of the reference signals with a lower transmission power. Whether to perform the removing or addition operation can depends on a configuration from the BS 112 or 114 or by default. Subsequently, the normalized first and second measurements may be averaged to obtain a combined measurement. The combined measurement is used as an RRM measurement of the NR cell 102.

In the above example, due to the combination of the QCLed NR and LTE reference signals 134 and 132, the reference signal density for RRM measurement is increased. Accordingly, corresponding to a measurement occasion (e.g., spanning multiple OFDM symbols), RRM measurement accuracy can be improved. In addition, due to the increased reference signal density, respective RRM measurement duration may be reduced while maintaining a same accuracy level as an RRM measurement without assistance of the LTE reference signals 132. For example, the RRM measurement without assistance of the LTE reference signals may include 5 measurement occasions, and last for duration of 200 ms. The RRM measurement based on both LTE and NR reference signals may include 3 measurement occasions, and last for 120 ms. However, a total number of REs captured by the latter measurement can be more than that of the former measurement due to the increased reference signal density. Accordingly, the UE 120 may benefit from the reduced number of measurement occasions and shortened measurement duration, and save power accordingly.

In one example, the UE 120 performs RRM measurement for the LTE cell 101. For example, in order to facilitate handover operations in the LTE system, the UE 120 may be configured to monitor signal quality of a set of LTE cells including the serving cell 101 and other LTE neighboring cells. Similarly, with the knowledge that the NR and LTE reference signals 134 and 132 are QCLed, the UE 120 may combine the LTE CRSs of the cell 101 with the SSSs of the NR SS blocks of the cell 102 to perform the RRM measurement for evaluating a quality of the LTE cell 101. The UE 120 can similarly benefit from the increased reference signal density.

Similarly to the above examples, the NR CSI-RSs can be used in place of the NR SSSs and combined with the LTE CRSs to improve RRM measurement over the LTE cell 101 or the NR cell 102.

In one example, the UE 120 performs channel estimation for purpose of coherent demodulation of broadcast channel, control channel, or data channel in physical layer over the NR cell 102. In the example, no beam sweeping is employed in the NR cell 102. With the knowledge that the NR reference signals 134 (SS blocks and/or CSI-RSs) and the LTE reference signals 132 are QCLed, the UE 120 can perform channel estimation based on the LTE reference signals 132 or based on a combination of the LTE and NR reference signals 132 and 134.

For example, when the UE 120 performs channel estimation based on the LTE reference signals 132, the NR cell 102 may avoid transmitting additional DMRSs so that an overhead of reference signals for channel estimation can be reduced in the NR cell 102.

When the UE 120 combines the LTE and NR reference signals 132 and 134 to perform the channel estimation, reference signal density can be increased in time domain and/or frequency domain. Accordingly, channel estimation performance can be improved. For example, due to combination of the LTE and NR reference signals, the number of adjacent OFDM symbols containing the reference signals can be increased. Accordingly, some channel statistic characteristics, such as multipath delay, Doppler shift, Doppler spread, and the like, may be estimated with a higher accuracy. With a higher reference signal density, channel coefficient of a channel matrix modelling a respective wireless channel can also be estimated with a higher accuracy.

For control channels and broadcast channel of the NR cell 102 that are co-located with respective SS blocks, the above channel estimation results can be used to perform respective coherent demodulations. For data channels of the NR cell 102 not co-located with the respective SS blocks, if transmission configuration indicators (TCIs) carried in downlink control information (DCI) indicate the data channels are QCLed with the respective SS blocks, the above channel estimation results can be used to perform coherent demodulations of the data channels.

In another example, beam sweeping is employed in the NR cell 102. The UE 120 performs channel estimation over the NR cell 102 for purpose of coherent demodulation of broadcast channel, control channel, or data channel in physical layer. When the QCL configuration 140 indicates one SS block of the NR cell 102 (for example, with an SS block index of A) are QCLed with the LTE CRSs of the LTE cell 101. The UE 120 may use the LTE CRSs, or combine the LTE CRSs with the SSSs of SS blocks having the index A to estimate channel statistic characteristics (e.g., Doppler shift, Doppler spread, multipath delay, etc.) and perform channel estimation. Similarly, control channels, broadcast channel, and data channels that are OCLed with the SS blocks with index A can be demodulated based on results of the channel estimation.

In other examples, the UE 120 uses the QCLed NR reference signals 134 (SS blocks and/or CSI-RS) to estimate channel statistic characteristics or perform channel estimation for coherent demodulation of broadcast channels or data channels over the LTE cell 101. Similarly, the channel estimation may be based on the NR reference signals 134 or based on a combination of the LTE and NR reference signals 132 and 134.

Figure 2:
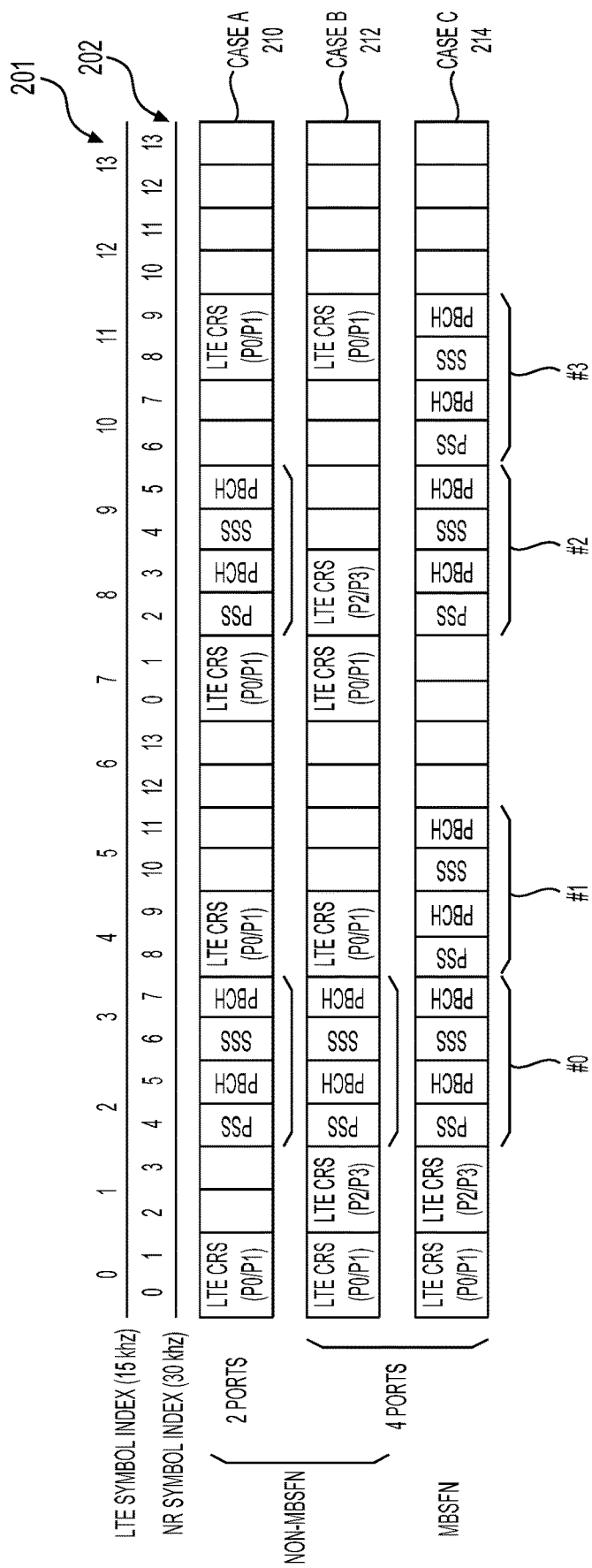
FIG. 2 shows examples of downlink Long Term Evolution (LTE) and New Radio (NR) reference signal configurations in time domain in LTE/NR co-channel coexistence scenarios according to some embodiments of the disclosure.

FIG. 2 shows examples of downlink LTE and NR reference signal configurations in time domain in LTE/NR co-channel coexistence scenarios according to some embodiments of the disclosure. In example co-channel coexistence scenarios, an LTE system and a NR system share a same spectrum for uplink and downlink transmission. The LTE system operates with a subcarrier spacing of 15 kHz. The NR system operates with a subcarrier spacing of 30 kHz. LTE OFDM symbol indexes 201 and NR OFDM symbol indexes 202 corresponding to a subframe are shown at the top of FIG. 2. The NR symbol indexes 202 correspond to two slots each containing 14 NR symbols. As shown, the duration of a NR symbol is a half of the duration of an LTE symbol. The coexisting systems may operate in TDD or FDD mode. Three coexistence cases A/B/C are shown in FIG. 2 each corresponding to a different configuration. Three sequences of downlink OFDM symbols 210/212/214 are shown corresponding to the three coexistence cases A/B/C.

In an LTE/NR co-channel coexistence scheme, downlink time-frequency resources can be dynamically scheduled or semi-statically allocated to facilitate sharing between the LTE and NR systems. Some resources can be reserved by configuration for LTE downlink channels, such as PSS, SSS, PBCH, and CRS of respective LTE system. The NR system does not use those reserved resources such that respective LTE signals can be protected. For example, the NR system can avoid transmissions in the resources corresponding to the LTE CRSs as shown in Case A and Case B. In this way, legacy LTE devices would operate normally in a co-channel coexistence deployment scenario, while a same spectrum can be shared by both LTE and NR systems.

In FIG. 2, Case C corresponds to a scenario where the LTE system transmits a Multicast Broadcast Single Frequency Network (MBSFN) subframe with a configuration of 4 antenna ports. Accordingly, the first and second LTE symbols carry CRSs. The port 0 (P0) and port 1 (P1) CRSs are carried in the first LTE symbol by frequency multiplex. The port 2 (P2) and port 3 (P3) CRSs are carried in the second LTE symbol by frequency multiplex. Four SS blocks with indexes #0-#3 arranged at the NR symbols 4-11 of the first slot, and the NR symbols 2-9 of the second slot.

Case A corresponds to a scenario where the LTE system transmits a non-MBSFN subframe with two antenna ports (P0 and P1). P0/P1 LTE CRSs are carried in the LTE symbols 0, 4, 7, and 11. Accordingly, two NR SS blocks corresponding to the SS blocks #0 and #2 of Case C are transmitted, while two NR SS blocks corresponding to the SS blocks #1 and #3 of Case C are omitted to avoid collisions with the LTE CRSs.

Case B corresponds to a scenario where the LTE system transmits a non-MBSFN subframe with 4 antenna ports (P0-P3). Compared with Case A, additional P2/P3 CRSs are positioned at the LTE symbols 1 and 8. To avoid collisions with the LTE CRSs, one SS block is transmitted while three other SS blocks corresponding to SS block #1-#3 are omitted.

As shown in FIG. 2, number of LTE and NR reference signals available for RRM measurement or channel estimation, when combined together, has been increased compared with either the LTE reference signals or the NR reference signals. Accordingly, when the LTE and NR reference signals are QCLed, and power offsets are known in advance, accuracy of RRM measurement and channel estimation can be improved, and power consumption for the RRM measurement can be saved.

In addition, due to the increased reference signal density, more consecutive OFDM symbols carrying reference signals can be available for estimating some channel statistic characteristics, such as Doppler shift, Doppler spread, and multi-path delay. Accuracy for estimating those channel statistic characteristics can be increased. For example, the SS blocks each include a PSS, an SSS, and a PBCH (occupying multiple symbols). A symbol carrying PBCH also carries DMRSs for decoding the respective PBCH. Those DMRSs can also be used for RRM measurement or channel estimation. Thus, four symbols corresponding to one SS block can each carry available reference signals available for RRM measurement and channel estimation.

Accordingly, in Case B, there are 7 adjacent OFDM symbols (from the NR symbol 0 to the NR symbol 9 in the first slot) available for Doppler shift or Doppler spread estimation. In contrast, solely considering the LTE CRSs, only two adjacent OFDM symbols (at the LTE symbols 0 and 1) are available. Solely considering the NR SS blocks, only 4 adjacent OFDM symbols are available. Similarly, in Case A, there are 5 adjacent OFDM symbols available at NR symbols 4-9 (the first slot), or 0-5 (the second slot). In case C, there are 10 adjacent OFDM symbols available at NR symbols 0-11 in the first slot.

Those adjacent OFDM symbols in Case A, Case B, or Case C include both LTE and NR reference signals. Accordingly, in various examples, RRM measurement or channel estimation can be performed over a time period spanning OFDM symbols part of which carry LTE reference signals and part of which carry NR reference signals.

It is noted that in other LTE/NR coexistence deployment scenarios, reference signals available for RRM measurement or channel estimation may be arranged differently from the FIG. 2 examples. For example, LTE and NR system may be deployed on separate carriers. Time-frequency resource scheduling may be performed independently. Accordingly, respective LTE or NR reference signals may be configured and transmitted separately with configurations different from the FIG. 2 example.

Figure 3:
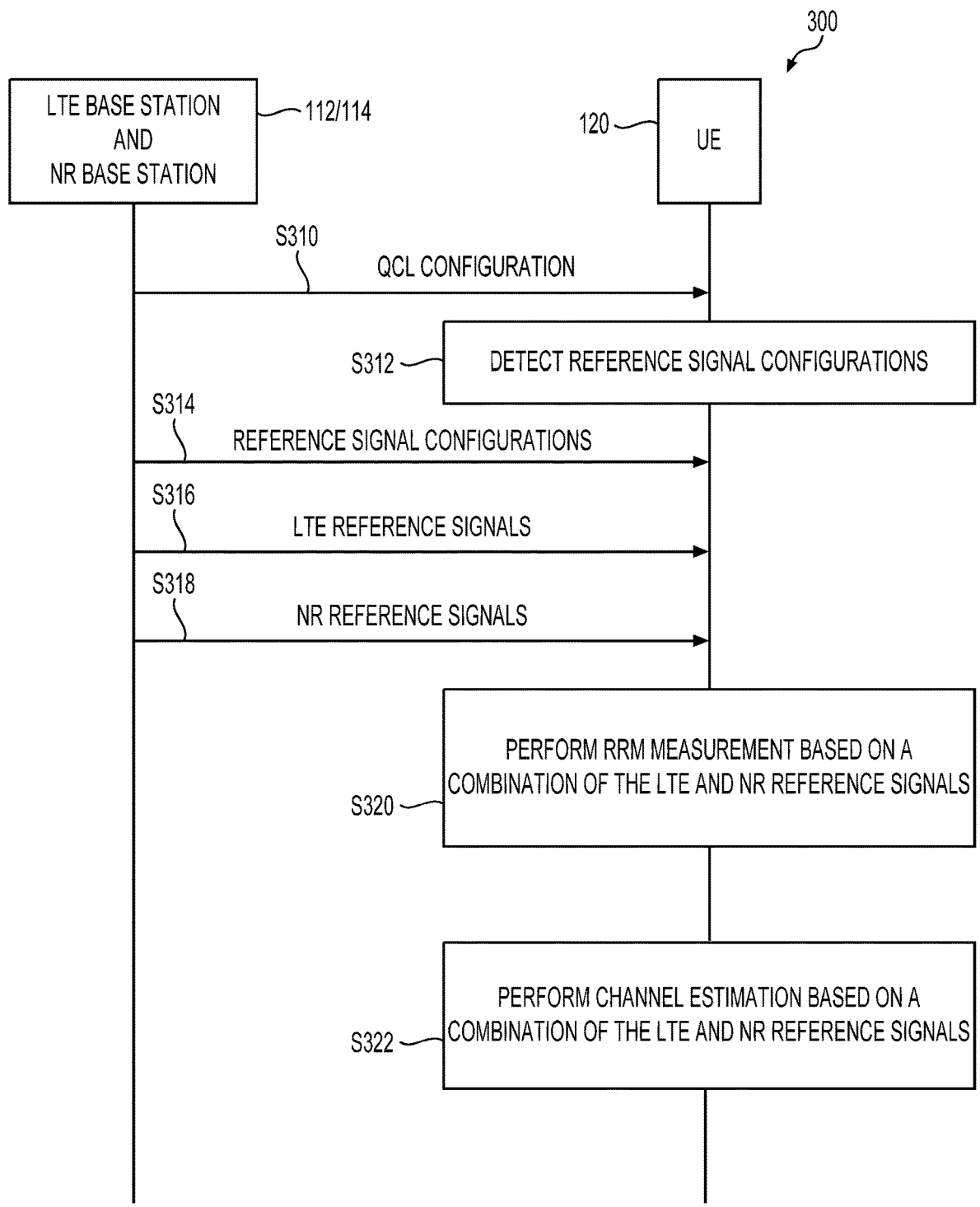
FIG. 3 shows an example process of performing radio resource management (RRM) measurement and/or channel estimation based on quasi-co-located (QCLed) reference signals from coexisting LTE/NR systems.

FIG. 3 shows an example process 300 of performing RRM measurement and/or channel estimation based on QCLed reference signals from coexisting LTE/NR systems. The coexisting systems are based on the co-located LTE and NR BSs 112/114 for example. The process 300 can be performed at the UE 120. The process 300 can be performed in an EN-DC scenario where the UE 120 is in dual-connectivity with the BSs 112/114. In the EN-DC scenario, either the LTE BS 112 or the NR BS 114 functions as a master node corresponding to a PCell. The other one functions as a secondary node corresponding to a PSCell.

The process 300 can also be performed in a single connectivity scenario where the UE 120 is connected to a serving cell. The serving cell is formed by one of the LTE or NR BSs 112/114. The other one of the LTE or NR BSs 112/114 forms a non-serving cell with respect to the serving cell. While connected to the serving cell, the UE 120 may turn on an RF circuit to listen to the QCLed reference signals from the non-serving cell. The UE 120 may thus perform RRM measurement or channel estimation based on a combination of the QCLed reference signals from the serving cell and the non-serving cell.

At S310, a QCL configuration, such as the QCL configuration 140, can be transmitted from one of the LTE BS 112 or the NR BS 114, and received at the UE 120. Corresponding to the EN-DC scenario, the QCL configuration can be transmitted from either the master node or the secondary node. Corresponding to the single connectivity scenario, the QCLed configuration may be transmitted from the serving cell.

After S310, reference signal configurations, such as the reference signal configurations 142 or 144, can be detected by the UE 120 (S312), or can be received at the UE 120 from the BS 112 or 114 (S314). For example, corresponding to the EN-DC scenario, a reference signal configuration of the master node may first be obtained by detection (e.g., LTE cell 101 is PCell) or by detection plus signaling message (e.g., NR cell 102 is PCell). Subsequently, the reference signal configuration of the PSCell may be transmitted to the UE 120 from the PCell. Alternatively, in the PSCell, the UE 120 may perform detection to obtain the reference signal configuration of the PSCell (e.g., LTE cell 101 is the PSCell), or may detect a part of the reference signal configuration of the PSCell and receive the remaining part from the PSCell (e.g., NR cell 102 is the PSCell).

Corresponding to the single connectivity scenario, a reference signal configuration of the non-serving cell may similarly be received from the serving cell. Or, the reference signal configuration of the non-serving cell may similarly be obtained by detection, or by detection plus receiving a signaling message from the serving cell.

At S316, LTE reference signals, such as the LTE reference signals 132 can be transmitted periodically from the LTE BS 112 and received at the UE 120.

At S318, NR reference signals, such as the NR reference signals 134 may be transmitted periodically from the NR BS 114 and received at the UE 120.

At S320, RRM measurement based on a combination of the received LTE and NR reference signals can be performed.

At S322, channel estimation based on a combination of the received LTE and NR reference signals can be performed.

It is noted that while the steps of the process 300 is presented as a sequence of operations in FIG. 3, in alternative examples, the steps of the process 300 may be performed in different order or performed in parallel, and not all steps are performed in some examples.

Figure 4:
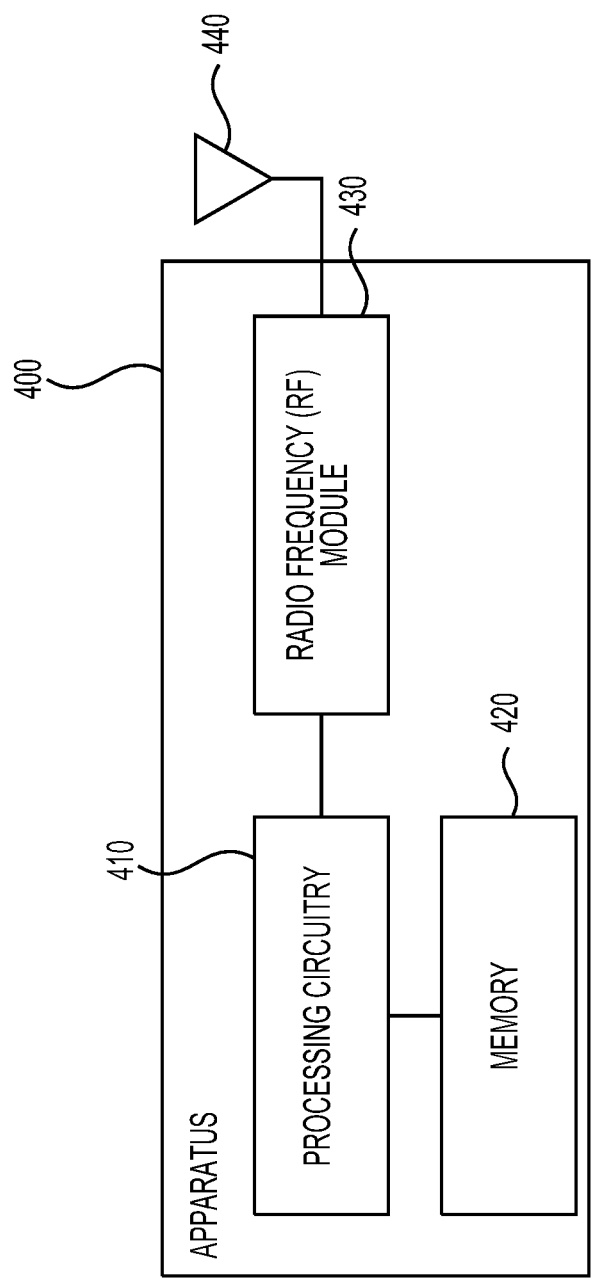
FIG. 4 shows an exemplary apparatus according to embodiments of the disclosure.

FIG. 4 shows an exemplary apparatus 400 according to embodiments of the disclosure. The apparatus 400 can be configured to perform various functions in accordance with one or more embodiments or examples described herein. Thus, the apparatus 400 can provide means for implementation of techniques, processes, functions, components, systems described herein. For example, the apparatus 400 can be used to implement functions of the UE 120, the LTE BS 112, or the NR BS 114 in various embodiments and examples described herein. The apparatus 400 can be a general purpose computer in some embodiments, and can be a device including specially designed circuits to implement various functions, components, or processes described herein in other embodiments. The apparatus 400 can include processing circuitry 410, a memory 420, and a radio frequency (RF) module 430.

In various examples, the processing circuitry 410 can include circuitry configured to perform the functions and processes described herein in combination with software or without software. In various examples, the processing circuitry can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 410 can be a central processing unit (CPU) configured to execute program instructions to perform various functions and processes described herein. Accordingly, the memory 420 can be configured to store program instructions. The processing circuitry 410, when executing the program instructions, can perform the functions and processes described herein. The memory 420 can further store other programs or data, such as operating systems, application programs, and the like. The memory 420 can include a read only memory (ROM), a random access memory (RAM), a flash memory, a solid state memory, a hard disk drive, an optical disk drive, and the like.

The RF module 430 receives processed data signal from the processing circuitry 410 and transmits the signal via an antenna 440, or vice versa. The RF module 430 can include a digital to analog converter (DAC), an analog to digital converter (ADC), a frequency up converter, a frequency down converter, filters, and amplifiers for reception and transmission operations. In some examples, the RF module 440 can include multi-antenna circuitry (e.g., analog signal phase/amplitude control units) for beamforming operations. The antenna 440 can include one or more antenna arrays.

The apparatus 400 can optionally include other components, such as input and output devices, additional signal processing circuitry, and the like. Accordingly, the apparatus 400 may be capable of performing other additional functions, such as executing application programs, and processing alternative communication protocols.

It is noted that while NR and LTE systems are utilized in the embodiments of the disclosure, the disclosure is not limited to this. The disclosure is applicable to any other suitable coexisting communication systems.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
receiving first reference signals of a first system in a wireless communication network at a user equipment (UE), the first system is a Long Term Evolution (LTE) system;
receiving second reference signals of a second system in the wireless communication network at the UE, the second system is a New Radio (NR) system;
receiving a quasi-co-location (QCL) configuration from one of the first and second systems, the QCL configuration indicating the first reference signals and the second reference signals are quasi-co-located (QCLed) or co-located; and
performing a radio resource management (RRM) measurement or a channel estimation based on a combination of the QCLed first reference signals and second reference signals, wherein at least one result of the RRM measurement or the channel estimation is generated based on at least one first reference signal and at least one second reference signal.

2. The method of claim 1, wherein the QCL configuration includes information indicating a first cell corresponding to the first reference signals is QCLed or co-located with a second cell corresponding to the second reference signals.

3. The method of claim 2, wherein the QCL configuration further includes information indicating primary synchronization signals (PSSs), secondary synchronization signals (SSSs), or cell-specific reference signals (CRSs) of the first system are QCLed with synchronization signal blocks (SS blocks) identified by an SS block index, or a channel state indicator reference signal (CSI-RS) of the second system.

4. The method of claim 1, wherein the QCL configuration includes a QCL type that is associated with a set of channel properties with respect to which the QCLed first and second reference signals are equivalent.

5. The method of claim 4, wherein the QCL type is one of:
QCL Type A: {Doppler shift, Doppler spread, average delay, delay spread},
QCL Type B: {Doppler shift, Doppler spread},
QCL Type C: {Doppler shift, average delay}, or
QCL Type D: {Spatial reception parameter}.

6. The method of claim 1, wherein the QCL configuration includes a power offset between the QCLed first and second reference signals.

7. The method of claim 6, wherein the power offset is represented as an energy per resource element (EPRE) offset.

8. The method of claim 1, wherein the QCL configuration is transmitted to the UE by a broadcasted system information block (SIB) or a dedicated signaling message, or is fixed and predefined.

9. The method of claim 1, further comprising:
receiving or detecting reference signal configurations of the first reference signals or the second reference signals.

10. The method of claim 9, wherein,
the reference signal configurations of the first reference signals includes one of:
a cell identity (ID) corresponding to the first system,
a number of cell-specific reference signal (CRS) antenna ports corresponding to the cell ID, or
primary synchronization signal (PSS) timing or secondary synchronization signal (SSS) timing corresponding to the cell ID; and
the reference signal configurations of the second reference signals includes one of:
a cell ID corresponding to the second system,
a subcarrier spacing corresponding to the cell ID,
a synchronization signal (SS) block burst set period corresponding to the cell ID,
a number and timings of SS blocks in each SS block burst set corresponding to the cell ID, or
an SS block measurement timing configuration (SMTC) offset corresponding to the cell ID.

11. The method of claim 1, wherein the UE is in dual connectivity with the first system and the second system, or the UE is in single connectivity with one of the first system and the second system.

12. The method of claim 1, wherein the performing the RRM measurement based on the combination of the QCLed first reference signals and second reference signals includes:
obtaining a first measurement with the second reference signals, and a second measurement with the first reference signals;
normalizing the first or second measurement according to a power offset; and
averaging the normalized first and second measurements to obtain a combined measurement.

13. The method of claim 12, wherein the normalizing the first or second measurement according to the power offset includes:
removing an amount of power defined by the power offset from the first or second measurement corresponding to the first or second reference signals that have a higher transmission power, or
adding the amount of power defined by the power offset to the first or second measurement corresponding to the first or second reference signals that have a lower transmission power.

14. The method of claim 1, wherein the performing the channel estimation based on the combination of the QCLed first reference signals and second reference signals include:
estimating channel statistic characteristics based on at least a first orthogonal frequency division multiplex (OFDM) symbol carrying the first reference signals, and a second OFDM symbol carrying the second reference signals, the first and second OFDM symbols adjacent to each other.

15. The method of claim 1, further comprising:
performing a first channel estimation based on the first reference signals, results of the first channel estimation used for coherent demodulation of second physical channels of the second system, or
performing a second channel estimation based on the second reference signals, results of the second channel estimation used for coherent demodulation of first physical channels of the first system.

16. An apparatus, comprising circuitry configured to:
receive first reference signals of a first system in a wireless communication network, the first system is a Long Term Evolution (LTE) system;
receive second reference signals of a second system in the wireless communication network, the second system is a New Radio (NR) system;
receive a quasi-co-location (QCL) configuration from one of the first and second systems, the QCL configuration indicating the first reference signals and the second reference signals are quasi-co-located (QCLed) or co-located; and
perform a radio resource management (RRM) measurement or a channel estimation based on a combination of the QCLed first reference signals and second reference signals wherein at least one result of the RRM measurement or the channel estimation is generated based on at least one first reference signal and at least one second reference signal.

17. The apparatus of claim 16, wherein the QCL configuration includes information indicating a first cell corresponding to the first reference signals is QCLed with a second cell corresponding to the second reference signals.

18. The apparatus of claim 17, wherein the QCL configuration further includes information indicating primary synchronization signals (PSSs), secondary synchronization signals (SSSs), or cell-specific reference signals (CRSs) of the first system are QCLed with synchronization signal blocks (SS blocks) identified by an SS block index, or a channel state indicator reference signal (CSI-RS) of the second system.

19. The apparatus of claim 16, wherein the QCL configuration includes a QCL type that is associated with a set of channel properties with respect to which the QCLed first and second reference signals are equivalent.

* * * * *